United States Patent [19]

Buhrke et al.

[11] Patent Number: 4,894,822
[45] Date of Patent: Jan. 16, 1990

[54] FAST PACKETIZED DATA DELIVERY FOR DIGITAL NETWORKS

[75] Inventors: Rolfe E. Buhrke, Westchester; James A. Davis, Glen Ellyn, all of Ill.; Douglas A. Spencer, Boulder, Colo.

[73] Assignee: AT&T Information Systems American Telephone and Telegraph Company, Holmdel, N.J.

[21] Appl. No.: 126,074

[22] Filed: Nov. 24, 1987

[51] Int. Cl.⁴ .............................................. H04Q 11/04
[52] U.S. Cl. ........................................ 370/60; 379/220
[58] Field of Search ....................... 370/60, 94, 58, 118, 370/110.1; 379/220, 229

[56] References Cited

U.S. PATENT DOCUMENTS

| | | |
|---|---|---|
| 4,112,258 | 9/1978 | Alles ............................... 179/15 AT |
| 4,408,323 | 10/1983 | Montgomery ......................... 370/60 |
| 4,494,230 | 1/1985 | Turner ..................................... 370/60 |
| 4,592,048 | 5/1986 | Beckner et al. ......................... 370/60 |
| 4,679,189 | 7/1987 | Olson et al. ............................. 370/60 |

FOREIGN PATENT DOCUMENTS

| | | |
|---|---|---|
| 0219049 | 4/1987 | European Pat. Off. . |
| WO8603355 | 6/1986 | PCT Int'l Appl. . |

OTHER PUBLICATIONS

Nagasawa, M. et al., "Packet Switching Network Access Protocols for Multi-Media Packet Communications", *Journal of the Institution of Electronic and Radio Engineers*, Jun./Jul., 1986, No. 6/7, 56, pp. 243-247.

Y. Ikeda et al., "Enhanced Packet Switching Architecture for Advanced ISDN Services", *International Switching Symposium*, Mar. 15-20, 1987, pp. A4.2-.1-A4.2.7.

F. M. Burg et al., "ISDN Packet-Mode Bearer Services: X.31 and LAPD", *Southcon/86 Conference Record*, Orlando, Fla., Mar. 18 -20, 1986, pp. 1-9. (Also slides used for presentation).

"Packetized Data Transfer in Private Switching Networks", European Computer Manufacturers Association (ECMA). Agreed by TC32-TG6 12th Plenary Session, Jun. 23-24, 1987, as a Proposed Final Draft ECMA Technical Report for voting by TC32 on Aug. 27-28, 1987.

"LAPD Data Transport Service: A Proposed New Packet Mode Bearer Service", AT&T Technologies, submitted to T1D1.2 Meeting in Reston, Va. Mar. 3-7, 1986, (T1D1.2/86-103), pp. 1-3.

"General Description of Proposed Packet Mode Bearer Service", AT&T Technologies, submitted to T1D1.2 Meeting, Reston, Va. Mar. 3-7, 1986, pp. 1-4.

"New Packet Mode' Signalling Procedures", AT&T Information Systems, Feb. 18, 1986, pp. 1-11.

"Inclusion of New Packet Mode Bearer Service in Rec. I.211", AT&T Technologies, submitted to T1D1.1 Meeting in Mesa, Ariz., Nov. 18-22, 1985, (T1D1.1/85158R, T1D1/85-146), pp. 1-6.

"Proposed Application of LAPD Based Packet Mode", GTE Telenet, Contribution to T1D1, Denver, Co., Dec. 10, 1984, (T1D1.1/84-092, T1D1.3/84-077), p. 1.

*Primary Examiner*—Joseph A. Orsino
*Assistant Examiner*—Frank M. Scutch, III
*Attorney, Agent, or Firm*—Marc A. Blackwell

[57] ABSTRACT

A method and apparatus for decreasing delay and use of data processing resources in the reliable transmission of data frames in a packet network. In transmitting data from a source to a destination over a plurality of intermediate data switching points, the data processing required for each frame is selectively varied at each data switching point, according to the requirements for transmission of data frames of a message and of the succeeding link used for that message. A virtual link address is transmitted with each data frame which is translated into the mode of processing the frame at the data switching point, and into the virtual and real address of the next data link. Advantageously, such an arrangement allows for minimizing the data processing load and delay at each protocol handler of the data path through the packet network.

41 Claims, 8 Drawing Sheets

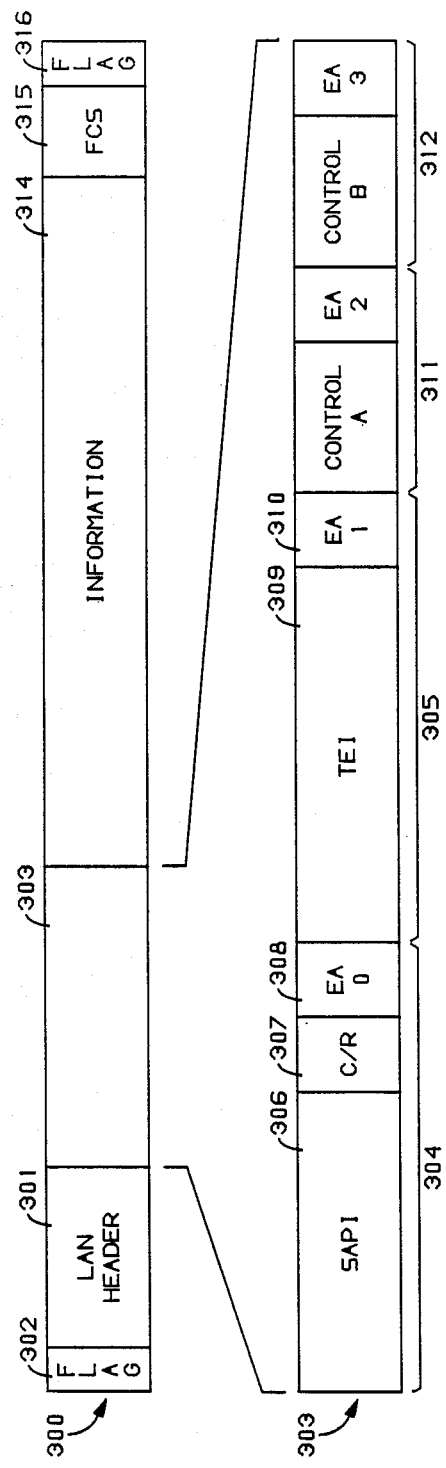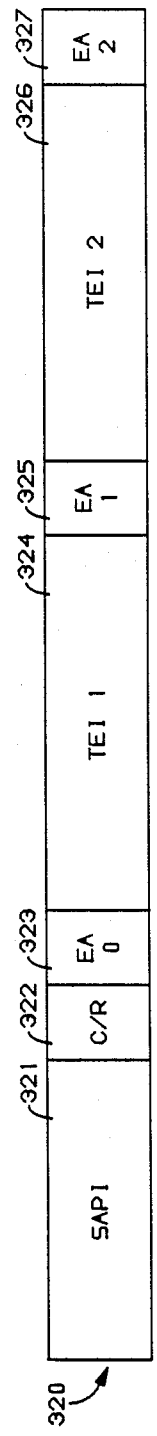
FIG. 3
FIG. 4

| INDEX | MODE | PHYSICAL DESTINATION | VIRTUAL LINK |
|---|---|---|---|
| ⋮ | | | |
| 378 | 01 | T 1 | 491 |
| ⋮ | | | |

PH 210-1: FROM PH 210-2

FIG. 6

| INDEX | MODE | PHYSICAL DESTINATION | VIRTUAL LINK |
|---|---|---|---|
| ⋮ | | | |
| 27 | 02 | PH 210-1 | 1 |
| ⋮ | | | |
| 57 | 02 | T 1 | 46 |
| ⋮ | | | |

PH 210-1: FROM PI 223-1

FIG. 7

| INDEX | MODE | PHYSICAL DESTINATION | VIRTUAL LINK |
|---|---|---|---|
| ⋮ | | | |
| 46 | 02 | PI 223 | 57 |
| ⋮ | | | |
| 491 | 01 | PH 210-2 | 378 |
| ⋮ | | | |

PH 210-1: FROM T 1

FIG. 8

| INDEX | MODE | PHYSICAL DESTINATION | VIRTUAL LINK |
|---|---|---|---|
| 1 | 02 | PI 223 | 27 |
| ⋮ | | | |

PH 210-1: FROM PH 210-1

FIG. 9

| INDEX | MODE | PHYSICAL DESTINATION | VIRTUAL LINK |
|---|---|---|---|
| ⋮ | | | |
| 378 | 01 | TSIU 221, TS-12 | 397 |
| ⋮ | | | |

PH 210-2: FROM PH 210-1

FIG. 10

| INDEX | MODE | PHYSICAL DESTINATION | VIRTUAL LINK |
|---|---|---|---|
| ⋮ | | | |
| 38 | 02 | PH 210-2 | 1 |
| ⋮ | | | |
| 67 | 02 | TSIU 221, TS-12 | 75 |
| ⋮ | | | |

PH 210-2: FROM PI 229

FIG. 11

| INDEX | MODE | PHYSICAL DESTINATION | VIRTUAL LINK |
|---|---|---|---|
| | | ⋮ | |
| 75 | 02 | PI 229 | 67 |
| | | ⋮ | |
| 397 | 01 | PH 210-1 | 378 |
| | | ⋮ | |

PH 210-2: FROM TSIU 221, TS-12

FIG. 12

| INDEX | MODE | PHYSICAL DESTINATION | VIRTUAL LINK |
|---|---|---|---|
| 1 | 02 | PI 229 | 38 |
| | | ⋮ | |

PH 210-2: FROM PH 210-2

FIG. 13

| INDEX | MODE | PHYSICAL DESTINATION | VIRTUAL LINK |
|---|---|---|---|
| | | ⋮ | |
| 87 | 02 | TSIU 230, TS-12 | 75 |
| | | ⋮ | |
| 353 | 01 | TSIU 230, TS-12 | 397 |
| | | ⋮ | |

PH 215-1: FROM PH 215-2

FIG. 14

| INDEX | MODE | PHYSICAL DESTINATION | VIRTUAL LINK |
|---|---|---|---|
| | | ⋮ | |
| 75 | 02 | PH 215-2 | 87 |
| | | ⋮ | |
| 397 | 01 | PH 215-2 | 353 |
| | | ⋮ | |

PH 215-1: FROM TSIU 230, TS-12

FIG. 15

| INDEX | MODE | PHYSICAL DESTINATION | VIRTUAL LINK |
|---|---|---|---|
| | | ⋮ | |
| 87 | 02 | DL 22 | 95 |
| | | ⋮ | |
| 353 | 01 | DL 22 | 327 |
| | | ⋮ | |

PH 215-2: FROM PH 215-1

FIG. 16

| INDEX | MODE | PHYSICAL DESTINATION | VIRTUAL LINK |
|---|---|---|---|
| | | ⋮ | |
| 95 | 02 | PH 215-1 | 87 |
| | | ⋮ | |
| 327 | 01 | PH 215-1 | 353 |
| | | ⋮ | |

PH 215-2: FROM DL 22

FIG. 17

FAST PACKETIZED DATA DELIVERY FOR DIGITAL NETWORKS

TECHNICAL FIELD

This invention relates to arrangements for efficient transmission of packetized data through a data network.

BACKGROUND OF THE INVENTION

The trend in modern telecommunication switching systems has been to provide flexible data services as well as providing voice services. In particular, proposals have been made for an integrated services digital network (ISDN) arrangement in which customers can exchange data as well as voice communications over the same facility. Data and voice communications in proposed ISDN arrangements are generally arranged to be sent in packets and to use the packet switching protocols of the X.25 and X.31 standards adopted by the Consultative Committee on International Telephone and Telegraph (CCITT) for communications between a terminal and a connected ISDN switch.

The protocols used for transmitting packetized data in proposed ISDN arrangements are layered according to the Open Systems Interconnection (OSI) Model of the International Standards Organization (ISO). The bottom or first layer, the physical layer, defines the type of electrical signal which is transmitted over a facility. Layer 2 is used for communicating packetized data over a link from a terminal to a data network or node, or over a link between data nodes. The third layer, used for communicating with a data network, conveys addressing data defining a path. Higher layers also exist but are not pertinent to this discussion.

For data communications, it is very important that reliable transmission be attained in which virtually all transmitted data packets are delivered without errors, checked for the proper order of arrival, and acknowledged. The packet switching protocols or basic rules for providing reliable data communications at different layers provide a high degree of flexibility so that the total volume of data traffic over a network may be optimized under a variety of traffic conditions.

A result of this high degree of flexibility is that each frame of a packet, which must traverse many links within a data network before reaching its destination, is repeatedly subjected to extensive data processing. This data processing introduces substantial delay in the transmission of a data packet from its source to destination and heavily uses specialized resources which perform such data processing, called protocol handlers, within each node of a data network.

A problem of the prior art therefore exists in that there is no satisfactory arrangement for achieving minimum delay and minimum protocol handler resource utilization in the transmission of customer data packets through data networks while maintaining the high level of reliability characteristic of international data transmission protocols.

SUMMARY OF THE INVENTION

The foregoing problem is solved and a technical advance is achieved in accordance with the principles of the invention in an exemplary arrangement for fast data packet delivery through a data communication network or ISDN, wherein packetized digital information is processed at data switching points of the data path set up for that digital information by executing one of a plurality of sequences of program steps identified by control words in such data switching points for processing the digital information of that data path. The control words are assigned as part of the process of setting up the data connection or data path from a source terminal to a destination terminal. Advantageously, in such an arrangement, only the processing required for the digital information at each specific data switching point of the data path is performed, thus minimizing data transmission delay and minimizing the use of data processing resources in the data switching points.

In one specific embodiment of the invention, the data transfer phase of the X.25 layer 3 protocol and the Link Access Procedure for the D-channel (LAPD) protocol as specified in CCITT recommendation Q.921 are used as an end-to-end or user-to-user protocol in a data network. A preselected path is used and is identified in the memory of intermediate protocol handlers which forward data frames over that path. The link layer protocol format used in communications between intermediate nodes includes a 13-bit virtual link identifier which is substituted for the Service Access Point Identifier (SAPI) field and the Terminal End Point Identifier (TEI) field of octets 2 and 3 of LAPD layer 2 protocol specified in the CCITT standards. This 13-bit virtual link identifier identifies the next physical facility to be used for transmission to the next physical destination, and identifies the identifier of the next virtual link over which a data frame is to be sent; this new virtual link identifier is used at that next physical destination. A physical facility may be a permanent communication connection or a circuit switched communication connection over which data frames may be transmitted. The various 13-bit virtual link identifiers used for transmitting a data frame through the data network correspond to a preselected (virtual) communication path. Each intermediate point of the path has a set of tables, one table per incoming physical facility, for storing the identity of the next physical facility of the path and the outgoing virtual link identifier corresponding to each incoming virtual link identifier. Advantageously, as each data frame arrives at an intermediate point in the network, routing information can be easily and rapidly determined, and the data frame can be forwarded with minimum change in the layer 2 envelope and no change in the layer 3 data supplied by the end user. The change in the layer 2 envelope is the substitution of the layer 2 address field and the recalculating of the frame check sequence.

In accordance with features of this embodiment, the control words are mode indicators for specifying the processing treatment of a frame of data. One mode, a frame relay mode, simply substitutes the outgoing virtual link number for the incoming virtual link number and relays the frame to the next physical destination using the specified physical link. A second mode which might, for example, be used if a satellite link is required, requires the performance of full layer 2 functions including the examination of the control field of the layer 2 envelope to ascertain what functions must be performed. A third mode might specify full layer 2 and layer 3 processing. Advantageously, such an arrangement permits the choice of different processing of a given frame at various points in a data path, or permits different processing of frames at different times for a given data path. These advantages are made possible with minimum processing required to ascertain the mode for each data frame.

Therefore, in accordance with the principles of this invention, in a data transmission network, when a data path is set up between a source and a destination terminal, a control word for that data path is assigned to a data switching point and when that switching point receives packetized digital information over that data path, one of a plurality of sequences of program steps identified by that control word is executed for processing that digital information.

BRIEF DESCRIPTION OF THE DRAWING

FIGS. 3 and 4 are layouts of a frame of data, including a detailed layout of layer 2 data;

FIGS. 6-17 are layouts of tables for translating from an incoming virtual link number to a physical destination and output virtual link number.

DETAILED DESCRIPTION

Figure 1:
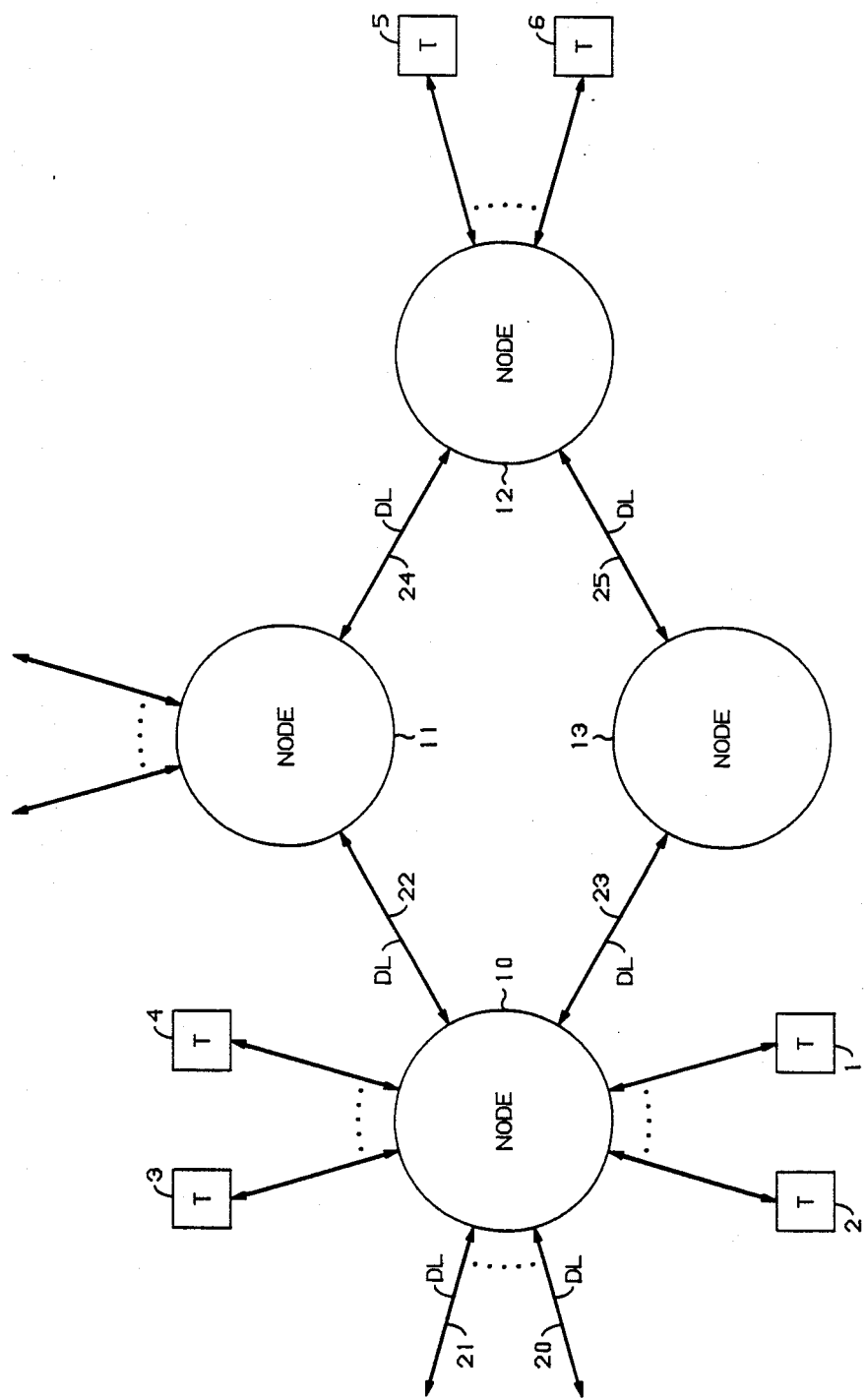
FIG. 1 is a diagram of a multi-node data network for practicing the invention.

The international ISDN protocol is standardized under the auspices of the CCITT in the Red Book issued following the VIIIth Plenary Assembly of Oct. 1984, Volume III, Fascicle III.5, Recommendation I.400, with I.440, I.441 (same as recommendation Q.920, Q.921) which describes the layer 2 protocol. The I.440, I.441 recommendations describe an integrated services digital network user-to-network interface data link arrangement. The layer 2 protocol for this arrangement is known as the LAPD protocol and can be used to convey ISDN layer 3 data, X.25 layer 3 data, or other layer data. Under these protocols, different layers communicate peer-to-peer as well as with adjacent layers; for example, layer 1 communicates with layer 1, layer 2 communicates with layer 2, layer 3 with layer 3, etc., at different points, and layer 1 communicates with layer 2, layer 2 communicates with layers 1 and 3, etc., at the same point. In this discussion, only layers 2 and 3 are pertinent. Peer-to-peer communications for any layer include all data of the next higher layer plus prefix and/or suffix data. Thus, for example, layer 3 communications are prefaced and suffixed by a layer 2 envelope as a data frame is sent from link to link; layer 2 data is transported by layer 1 as a data frame is sent from link to link.

For a connection of the type to be discussed herein, where the two communicating terminals are each connected to an ISDN switch of a data network, the LAPD layer 2 address format (i.e., SAPI=Service Access Point Identifier, TEI=Terminal Endpoint Identifier) is used only for the virtual links between the terminals and the ISDN network, while the internal layer 2 protocol, described herein, is used within the network. The data transfer phase of the X.25 layer 3 protocol is carried transparently between the end users by the ISDN network.

In order, presently, to achieve high reliability transmission in data networks, extensive checks and routing tasks are performed at each point through which a frame of data passes. Protocol handlers perform these checks and determine the next link to which a frame is to be sent. Normally, during the data transfer phase, i.e., after call establishment, all layer 2 and layer 3 data processing operations are performed at each protocol handler which forwards data over a data path. Typical protocol handlers require about 4 milliseconds to perform all layer 2 actions, and 4 milliseconds to perform all layer 3 actions, necessary to check and forward a frame to the next protocol handler.

In complex data networks, there are frequently occasions wherein a large number of frames of data are sent over several data links between two remote endpoints. Additionally, data is forwarded over several protocol handlers in each node of a path. The use of protocol handler resources to process and forward these frames one by one in a data network is a substantial expense and requires many protocol handlers. In accordance with the principles of this invention, several different modes of protocol processing are available at the protocol handlers, including a relay mode, for the switching of data frames within an ISDN network. Each data path has a mode indicator at each protocol handler to specify the processing treatment for data frames of that data path received at that protocol handler. When the relay mode is used, an address field contained in each frame includes a prefix which identifies a data path to be taken; this prefix is located within the data frame in the address field portion used for the LAPD layer 2 protocol information. When the relay mode is recognized during processing, this prefix is examined and is translated by means of a group of translation tables stored in memory of the protocol handlers and cause the frame to be forwarded to the next physical destination (i.e., protocol handler) associated with a virtual data path. In this mode of operation, only the virtual link identification number and the frame check sequence in the data frame may be changed as the frame advances from point to point. The virtual link identification number is used at each point in the path of the data frame to identify the next physical destination, thence the physical link, and to identify the virtual link number to be transmitted with the data frame. In this relay mode, once the virtual path is established at the beginning of the call, the layer 2 and layer 3 information is transported transparently through the network with the end users doing the full layer 2 and layer 3 protocol processing. This type of processing requires only a small fraction of the protocol handler resources otherwise required for performing the full layer 2 and layer 3 protocol processing of the X.25 protocol.

In order to utilize the frame relay mode in a network in which at least some data frames or data frames over at least some links (such as satellite links) require a different treatment than the frame relay mode, the translation from incoming virtual link to outgoing virtual link and outgoing physical link also provides a mode indicator. This mode indicator is used by the program that performs the protocol processing to initiate the processing of one of the modes of processing for each frame of data. The frame relay mode is one such mode but other modes such as full layer 2 processing, full layer 2 and layer 3 processing, or a special frame relay mode wherein the virtual link number is unchanged, thereby still further streamlining the relaying process, are also available. The mode indicator is a control word stored in a protocol handler for selecting a processing program or selecting a sequence of processing programs in accordance with the contents of the control word; the term mode indicator is used herein to avoid confusion with control segments of the data frames.

In the frame relay mode the layer 2 and layer 3 protocol processing is performed by the end users during the data transfer phase. A benefit of the frame relay mode is that despite the simplified intermediate processing, a frame acknowledgment received by the sender acknowledges receipt by the addressed end user.

In a second new mode described herein, called a frame switching mode, full layer 2 processing actions are performed at each node during the data transfer phase but the layer 3 actions are performed during the data transfer phase only at the end points of a data path. Advantageously, in such an arrangement, many more checks are performed at each intermediate node than are performed in the relay mode, but fewer protocol handler resources are required in the intermediate nodes than are required for the normal data transmission mode.

It should be noted that in both modes described above, it is possible to transport a wide variety of "foreign" user protocols (i.e., protocols that are different than those used by the network to implement its transport). Once the virtual path has been negotiated with the network using an extension of the standard Q.931 signaling procedures, the user may simply "encapsulate" his "foreign" protocol data frames within the layer 2 frame of the network so that the resulting frames can be switched through the network. Layer 2 and/or layer 3 protocols can thus be transported end-to-end.

The relay mode may be implemented as described below. Each prefix is associated with a table entry defining the mode of the virtual path, the next physical destination of the path, and the virtual link number to be inserted in the data frame. If the mode is "relay mode", only the following simple processing is performed. Whenever a protocol handler processes a data frame in the relay mode, that handler treats the address portions of the received second and third layer 2 prefix bytes, a virtual link number, as an index. The protocol handler uses this index to access one of a plurality of tables, selected on the basis of the incoming physical facility identification. In that table is found data identifying the physical destination to which that data frame is to be forwarded, and the number of the virtual link to be inserted in the data frame. The data frame is then routed via a physical facility to that data point. At the destination, the virtual link number is again used as an index to access a table.

Data frames may be transmitted between protocol handlers, for example, by connecting the protocol handlers to a local area network and prefacing a data frame with a virtual link identification. This virtual link identification is used by the receiving protocol handler for routing the data frame over one of its associated data links or for transmission via an internal data network to another protocol handler. Other types of physical paths are permanently connected data paths or circuit switched data paths. At the final protocol handler of the node of the network connected to the receiving terminal, the virtual link identifier will specify the receiving terminal endpoint, i.e., the endpoint process or application in the terminal which processes the layer 3 data of the data packet.

In the relay mode of operation, virtual data connections and their associated modes are set up by sending control messages to the controllers within the various nodes to cause them to initialize the protocol handlers to enter data into their data tables to translate from the identity of the incoming index, a virtual link number on each incoming data frame to the output index or virtual link number and identity of the data output link to be used for transmitting the data frame further on that virtual path. These control messages are sent over virtual paths dedicated to communicating with the controller of each node.

FIG. 1 shows four nodes of a larger network, nodes 10, 11, 12, and 13. It is desired that data be transferred from terminal (T)1 attached to node 10 to terminal (T)6 attached to node 12. The connection is to be via data link 22, which can be one of many data links on digital trunk 72 (FIG. 2), connecting nodes 10 and 11, and data link 24, carried on a digital trunk connecting nodes 11 and 12. An alternate path between nodes 10 and 12 is also available via data link 23, carried on digital trunk 73, connecting nodes 10 and 13, and data link 25, carried on a digital trunk connecting node 13 and 12.

Figure 2:
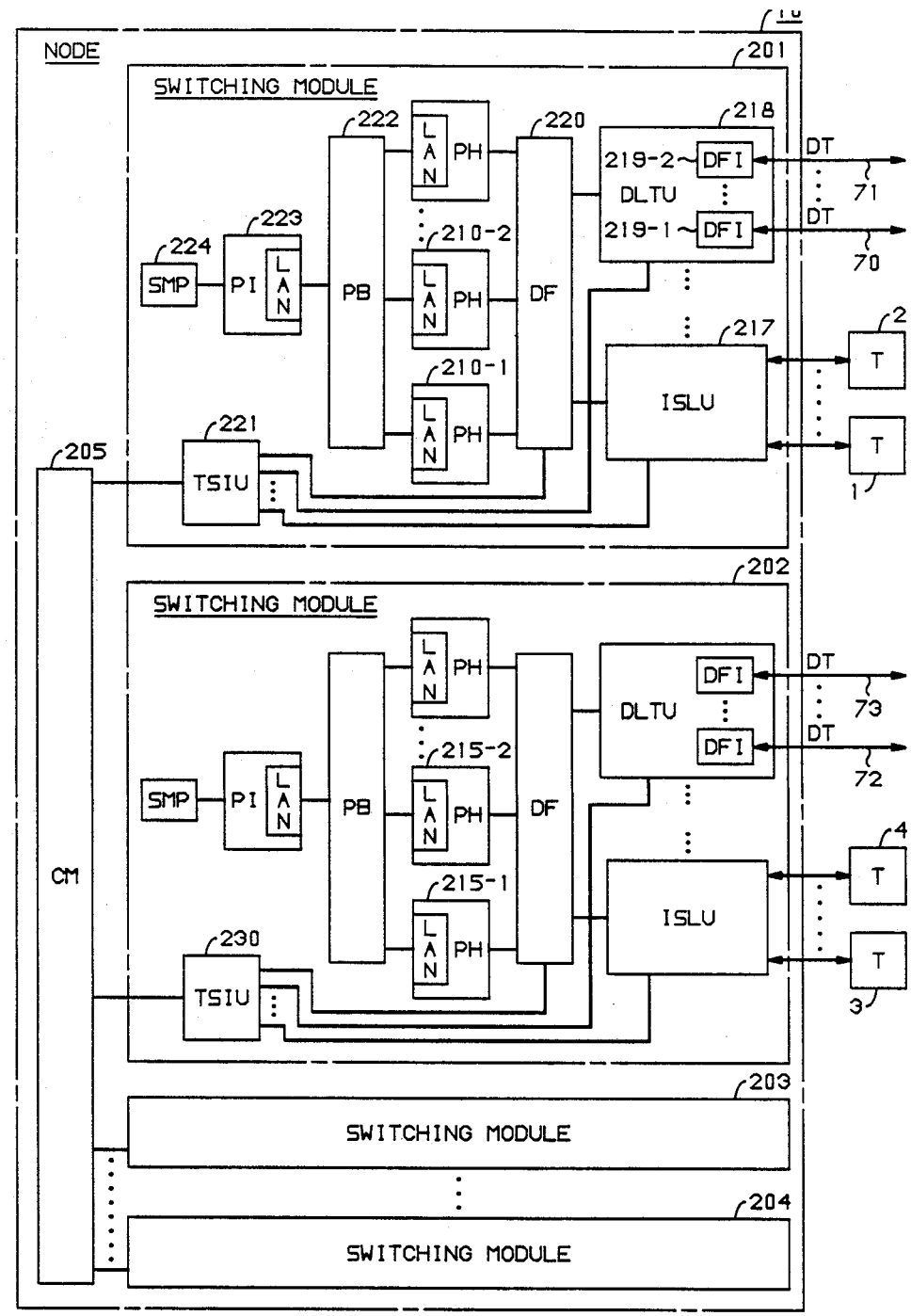
FIG. 2 is a detailed block diagram of one node of the network.

FIG. 2 is a block diagram of node 10. Node 10 comprises a plurality of digital switching modules comprising data switching facilities including modules 201, 202, 203, . . . , 204. These modules may for example be modules of a 5ESS TM switch as described in Beckner et al., U.S. Pat. No. 4,596,010, which is incorporated herein by reference. Only the pertinent portions of each switching module are shown. The switching modules are interconnected by a communications module CM 205 which is a well-known time multiplexed space division switch for interconnecting time-slot interchange units (TSIU's) of the various switching modules, such as TSIU 221 of switching module 201 and TSIU 230 of switching module 202. Inside each switching module is a group of protocol handlers such as 210-1 and 210-2 interconnected by a high speed packet bus 222.

These protocol handlers or data switching points, are connected on one side to a local area network, in this case packet bus 222. The other side of each protocol handler is connected to a data fan-out circuit 220 which is a time-slot interchange circuit for connecting the various input time slots from protocol handlers to output time slots; the output time slots are connected to a time-slot interchange unit 221 connected to communications module 205 and to the data outputs of integrated services line units (ISLU's) such as ISLU 217 and digital line and trunk units (DLTU's) such as DLTU 218. The ISLU's in turn are connected to communications terminals such as terminal 1 (T1) and terminal 2. The DLTU's include digital facilities interfaces (DFI's) such as 219-1 and 219-2. DFI 219-1 and 219-2 are connected respectively to the digital trunks 70 and 71 which carry data links 20 and 21, respectively. DLTU 218 and ISLU 217 are also directly connected to TSIU 221 so that digital circuits may be set up for circuit switching of digital signal outputs of these units.

A data frame travels, for example, from terminal 1 to ISLU 217 where the D-channel, or a B-channel to be packet switched, is stripped from the ISDN 2B+D data stream and is connected through data fan-out 220 to protocol handler 210-1. The data frame is then packet switched via packet bus 222 to protocol handler 210-2 where it is statistically multiplexed with other data frames and traverses data fan-out 220 to reach time-slot interchange unit 221. Thence, the data frame is circuit switched through TSIU 221 and communication module 205 to switching module 202. The data frame traverses a similar path through switching module 202 using a path that comprises TSIU-230, protocol handlers 215-1 and 215-2 to reach data link 22 carried on digital trunk 72. The connections between terminal 1 and ISLU 218-1, between ISLU 218-1 and data fan-out 220, between data fan-out 220 and protocol handler 210-1, between protocol handler 210-2 and data fan-out 220, between data fan-out 220 and time-slot interchange unit 221, and between time-slot interchange unit 221 and communications module 205 are all circuit switched; the connections between protocol handler 210-1 and protocol handler 210-2 are packet switched via packet bus 222.

Packet bus 222 also is connected to processor interface (PI) 223, a special protocol handler which is connected to switching module processor 224, the control processor of switch module 201. Control packets are sent to and from switching module processor 224 via processor interface 223.

As discussed earlier, each of the protocol handlers has one side connected through a local area network (LAN) interface to packet bus 222 which is a local area network medium. Whenever a local area network interface is connected to a unit which has a data frame to be sent, that interface will try to seize the data medium whenever that medium becomes available. Other local area networks such as token rings may be used in this arrangement since the principal requirement is that all units attached to the packet bus be able to get their fair share access to transmit and receive data frames from that bus and that contention among multiple transmitters be resolved.

The format of an information frame is shown in FIG. 3. For ease of understanding, in FIGS. 3 and 4, the contents of each byte are shown with the high order bits at the left, even though the byte is transmitted with the low order bits first. The basic format of the frame obeys the conventions of LAPD. This comprises an initial octet for flag 302, layer 2 address and control information 303 followed by the information field 314, followed by frame check sequence 315 to check the data, followed by a final flag octet 316. Information field 314 comprises layer 3 and higher layer data plus user data. When such a message is being transmitted on a local area network such as the packet bus 222, it is necessary to insert a LAN header 301 between the initial flag octet 302 and the layer 2 address and control field 303 to identify the particular local area network receiver which is to receive the frame.

When the relay mode is used, the significance of contents of the second and third octets of the layer 2 data, octets 304 and 305 is altered. Octet 304 consists of three fields of which field 306 in the LAPD protocol is used as a service access point identifier. Octet 305 consists of two fields of which field 309 is used in the LAPD protocol as a terminal end point identifier. When the relay mode is used, fields 306 and 309 are concatenated to form a 13 bit virtual link number or index. In an alternative configuration of the first and second octets of layer 2 data (FIG. 4), the service access point identifier is retained in the first octet in field 321. This permits the normal LAPD treatment of the SAPI data. This permits the use of a single physical facility to carry a variety of communications including both relay mode, conventional X.25 data link traffic, and signaling traffic. However, one or more specific values of SAPI is reserved for the relay mode and when this value is recognized, the contents of field 324 of the third octet and field 326 of the fourth octet are treated as a 14 bit virtual link identifier or index. The extended addressing bit 325 of the second octet, in this case, is marked to indicate that the address specified in field 324 is incomplete and is to be augmented by additional data from field 326.

Figure 5:
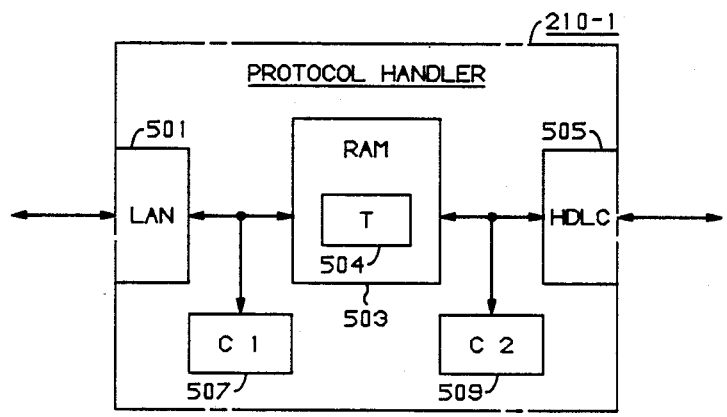
FIG. 5 is a block diagram of a protocol handler within one node.

FIG. 5 is a block diagram of a typical protocol handler, in this case protocol handler 210-1. To interface with the LAN or packet bus 222, a local area network interface circuit 501 is provided. This circuit is connected to a random access memory 503; the flow of data between LAN 501 and RAM 503 is under the control of a microprocessor controller C1 (507). The data fan-out circuit 220 interfaces with a high level data link controller (HDLC) 505 which, along with protocol software in the microprocessor C2, performs the layer 2 protocol processing operations. The communications between HDLC 505 and RAM 503 are controlled by microprocessor controller C2 (509). Thus, data from a user terminal typically enters HDLC 505 from data fan-out 220 and under the control of processor 509 is stored in the appropriate section of memory as identified from the header of the data frame. Table (T) 504 within RAM 503 comprises subtables selected on the basis of the physical input link defining the translations between the virtual link numbers of an incoming data frame and an outgoing data frame, defines the mode of processing to be executed on this data frame, and defines the destination including the identification of the LAN header necessary for transmitting the data frame over the packet bus to the next protocol handler. Under the control of processor 507, the contents of the RAM 503 are transmitted to packet bus 222. The other direction of transmission of data from packet bus 222 to data fan-out circuit 220 is handled in essentially the same way, again using the contents of Table T 504 to indicate the proper routing of the frame to the data fan-out circuit 220.

FIGS. 6-17 show entries in the tables such as Table 504 of protocol handler 210-1 that are placed in each protocol handler in order to route data frames through each protocol handler to the next destination. Each protocol handler has two sets of such tables, one for each direction of data transmission. For each direction of transmission, there is one table per incoming physical link, or per packet switched source connected to an incoming packet bus. The header attached to a data message for transmission over the LAN contains both the LAN destination address and the LAN source address. Each entry in such a table is identified by an index corresponding to the virtual path number of a data frame coming in from one direction and consists of three fields. The first field is a mode indicator indicating the mode in which the data frames identified by the incoming virtual link number are to be processed. The second field is the identification of the physical destination of data frames identified by the incoming virtual link number. The third field is the outgoing virtual link number, to be used as an index at the physical destination of the data frame. FIGS. 6, 7, 10, 11, 14, and 16 are tables of first sets, (i.e., for transmission of data frames from a LAN) and FIGS. 8, 9, 12, 13, 15, and 17 are tables of second sets (for transmission of data frames to a LAN). Tables of FIGS. 6-9 are in protocol handler 210-1, FIGS. 10-13 in 210-2, FIGS. 14 and 15 in 215-1 and FIGS. 16 and 17 in 215-2. Loop around within the protocol handler is also possible; in this case, the C2 processor stores a data frame received from the HDLC and, after possible additional processing by C1, transmits that data frame to the HDLC for further transmission to another device connected to the HDLC output of the protocol handler.

FIGS. 6–7 illustrate the entries in the control tables of protocol handlers 210-1, 210-2, 215-1, and 215-2 required to set up example virtual paths within node 10. Each virtual path comprises a group of virtual links. The virtual path used to transmit data from terminal T1 through node 10 to data link 22 and thence via node 11 and data link 24 to node 12 and thence to terminal 5 is illustrated in FIGS. 6–17 and comprises the following virtual links: virtual link 491 from T1 to PH 210-1; virtual link 378 from PH 210-1 to PH 210-2; virtual link 397 from PH 210-2 to TSIU 221 time-slot 12, thence to CM205, thence to TSIU 230 time-slot 12, thence to PH 215-1 of SM202; virtual link 353 between PH 215-1 and 215-2; and virtual link 327 between PH 215-2 and data link 22. The virtual path from SMP224 to Terminal 1 for signaling between the switching module processor and Terminal 1 comprises virtual links 46 from T1 to PH 210-1 and 57 from PH 210-1 to PI223 whence the signaling packets may be transferred to switching module processor 224. Another signaling path exists from switching module processor 224 to a processor in node 11 comprising the following virtual links: 67 between PI223 connected to SMP224 and PH 210-2; 75 from PH 210-2 via TSIU 221 using time-slot 12 via CM205 via TSIU 230 using time-slot 12 to PH 215-1; 87 from PH 215-1 to PH 215-2; and 95 from PH 215-2 to data link 22 and thence to node 11. Finally, two set-up paths are illustrated between switching module processor 224 and PH 210-1 and PH 210-2 for initializing these protocol handlers and for setting up virtual paths by making entries in the tables of these protocol handlers. The path between SMP224 and PH 210-1 comprises virtual link 27 between PI223 and PH 210-1; since the packet does not go out of PH 210-1 but is used internally by that protocol handler, the output virtual link is ignored and is arbitrarily set to 1. Similarly, the path from SMP224 to PH 210-2 includes virtual link 38 between PI223 and PH 210-2. Again, the equivalent of an output virtual link for this path is arbitrarily set to 1 since the path terminates at protocol handler 210-2.

In accessing the tables of FIGS. 6–17, the choice of table is made by the identity of the incoming device, such as the protocol handler which transmitted a data frame over a packet bus or the device connected to an HDLC. The index to obtain an entry in the table is the identity of the virtual link obtained from fields 306 and 309 or 321 and 326 of the incoming data frame. For simplicity, complete tables are not shown, but only the entries corresponding to the indexes used to explain the example.

FIG. 8 represents virtual links from Terminal 1 (T1) to protocol handler 210-1. The entry corresponding to index 491, representing incoming virtual link 491 from terminal 1, indicates that the destination is protocol handler 210-2 using virtual link 378. Note the corresponding entry in FIG. 6, for virtual link data from PH 210-2 to PH 210-1, is indexed by the virtual link 378, indicates that the destination is T1 using virtual link 491. Both of these entries show mode 01, the relay mode.

The path may be followed by noting the entry in FIG. 10 of PH 210-2 representing virtual links from PH 210-1. The entry corresponding to index 378, the virtual link number of the data path from PH 210-1 to PH 210-2, is the continuation of the virtual path. Again the mode indicator is 01 indicating that only the relay mode is to be used. The identification of the destination is time-slot 12 of TSIU 221 which is connected by a circuit path through communication module 205 to switching module 202, to PH 215-1 within that module. The virtual link number 397 is used for the link which connects this virtual path from protocol handler 210-2 to protocol handler 215-1.

Virtual link 397 may be followed in FIG. 15, which has virtual link entries for data received in PH 215-1 from time-slot 12 of TSIU 230 (the TSIU of SM 202). The entry corresponding to index 397 indicates that the mode 01 (the relay mode) is being used, that the data frame is to be transmitted to protocol handler 215-2 and that the virtual link for this latter connection is number 353. Virtual link 353 can be followed further in FIG. 16, which has virtual link entries for data received in PH 215-2 from PH 215-1. The entry for virtual link 353 shows that mode 01 is to be used, that the frame is to be transmitted over virtual link 327 to data link 22. The other end of data link 22 is connected to node 11 which contains a protocol handler (not shown) for receiving data carrying the virtual link number 327.

Table entries in FIGS. 6–17 are also shown for communications between switching module processor 224 and the two protocol handlers PH 210-1 and PH 210-2. The index for the local area network path between the processor interface 223 and protocol handler 210-1 has index 27 and is shown in FIG. 7. The mode for the data path to control PH 210-1, is 02, the frame switching mode previously discussed. Special checking and not simply relaying is required in this mode to protect control information for reliable performance since the data frames terminate at the protocol handler where they are used for controlling and initializing the table information in that protocol handler. For this connection, the physical destination of an incoming data frame is simply indicated as being that protocol handler (PH 210-1) while outgoing data frames from PH 210-1 are transmitted over the packet bus to processor interface 223. Since no link is required to continue the path beyond PH 210-1, the output virtual link number is ignored and therefore can be arbitrary; in this case 1 is selected. Similarly, for the virtual path between processor interface 233-1 and protocol handler 210-2, shown in FIG. 11, index 38 is used for the virtual link, mode 02 is also used for processing data frames received over that virtual link, and 1 is used for the output virtual link number.

These table entries must be initialized at start-up by "subscription" so that the signaling channel is defined. The path for sending control or signaling data frames over this signaling channel between terminal 1 and switching module processor 224 is shown in the entries using index 57 in FIG. 7 and index 46 in FIG. 8 of protocol handler 210-1. The frame switching node (02) in which layer 2 checks are performed, is used for protocol processing for data frames destined for the switching module processor, is also indicated. The extra checking is useful for such communications which are used for controlling the set-up of paths. At the two ends of the path, terminal 1 and the switching module processor 224 or its interface 223, the full layer 3 checks are performed.

Finally, a virtual path from switching module processor 224 to data link 22, destined for a switching module processor at the other end of data link 22 in node 11 is also shown. This path which is used to set up internodal virtual paths, also uses mode 02. The connection between protocol handler 210-2 and processor interface 223 is by virtual link 67 (FIGS. 11 and 13), that between protocol handlers 210-2 and 215-1 is by virtual link 75

(FIGS. 13 and 14), that between protocol handlers 215-1 and 215-2 is by virtual link 87 (FIGS. 15 and 16), and that over data link 22 to a switching module processor of node 11 is by virtual link 95 (FIGS. 16 and 17).

In this example, in order to avoid confusion, different virtual link numbers (indexes) have been used for different paths. However, as long as the same virtual link number is not used for two different virtual links on the same incoming physical link or from the same packet switched source connected to an incoming packet bus, there is no confusion in the system since each protocol handler has a full set of tables for each such physical link or packet switched source. It is, of course, possible to design a system so that each protocol handler has only a single table and that different virtual link numbers are assigned to all virtual links entering a protocol handler. This may be attractive in cases where the cost of memory is high and where the number of different virtual links in use at any one time is small.

Other modes involving more or fewer checking steps could also be implemented. For example, if a particular virtual path did not require changing the virtual link number at a given protocol handler, a mode indicator would inform the protocol handler that it was not necessary to insert a substitute virtual link number at that converter. If it were desired to perform some or all layer 3 checks, a special mode indicator could be reserved for this purpose. Also, a special mode could be used for informing the protocol handler that a virtual path, for example, for initializing tables of the handler, ended within the handlers. The modes can also be used for executing additional programs in a protocol handler for some data paths; for example, special traffic counts could be taken for some data paths using a different mode indicator, without requiring that a check for making such traffic counts be made for traffic on all data paths. The mode indicator is a convenient and efficient way of informing the protocol handler of the desired actions. The data discussed herein could represent many different types of information including alphanumeric, pictorial, video, or packetized voice.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In a data communication network comprising a plurality of data switching points, a method of transmitting packetized digital information from a source terminal to a destination terminal comprising the steps of:
   responsive to a request for setting up a data connection from said source terminal to said destination terminal, selectively assigning to one of said plurality of data switching points in a data path between said source and said destination terminals a mode indicator; and
   responsive to reception of said packetized digital information in said one of said plurality of data switching points of said data path, executing one of a plurality of sequences of program steps identified by said mode indicator for processing said packetized digital information.

2. The method of claim 1 wherein said packetized digital information comprises addressing data and wherein said assigning step comprises the step of entering said mode indicator in a translation table of said data switching point, and said executing step comprises the step of translating said addressing data using said translation table to access said mode control.

3. In a data communication network comprising a plurality of data switching points, a method of transmitting packetized digital information from a source terminal to a destination terminal comprising the steps of:
   responsive to a request for setting up a data connection from said source terminal to said destination terminal, selectively assigning to one of said plurality of data switching points in a data path between said source and said destination terminals a distinct individual control word; and
   wherein said packetized digital information comprises addressing data, and wherein said assigning step comprises the step of entering said control word in a translation table of said data switching point, and an executing step comprises the step of translating said addressing data using said translation table to access said control word; and
   responsive to reception of said one of said plurality of data switching points of said data path, executing one of a plurality of sequences of program steps identified by said individual control word for processing said packetized digital information;
   wherein said packetized digital information comprises a data frame that comprises a packet layer envelope and a link layer envelope and wherein said translating step comprises the step of extracting said addressing data from said link layer envelope.

4. The method of claim 3 wherein said translating step further comprises the step of translating said addressing data to obtain the physical address of a link for transmitting said data frame to another data switching point of said data path.

5. The method of claim 4 further comprising the step of translating said addressing data to obtain output data for substitution for said addressing data prior to transmitting said data frame to said next data point.

6. The method of claim 3 wherein said data path comprises a node, wherein said node comprises a plurality of data switching points, wherein said executing step comprises the step of adding internal addressing data for transmission of said data frame between switching points of said node; and
   deleting said internal addressing data prior to transmission of said data frame out of said node.

7. The method of claim 3 wherein at least one instance of said control word identifies a program for performing full link layer and full packet layer processing on said data frame.

8. The method of claim 3 wherein at least one instance of said control word identifies a program for performing full link layer processing but performing no packet layer processing on said data frame.

9. The method of claim 3 wherein said link layer envelope comprises a control field and at least one instance of said control word identifies a program for performing said translation to obtain said addressing data without performing processing indicated by said control field.

10. In a data communication network, a node for switching packetized digital information comprising:
    means for switching data;
    means, responsive to a request for setting up a data connection between a source terminal and a destination terminal, for selectively assigning to said data switching means a mode indicator for said data connection;

said data switching means responsive to reception of packetized digital information on said data connection for executing one of a plurality of sequences of program steps identified by said mode indicator for processing said packetized digital information.

11. The node of claim 10 wherein said data switching means comprises a translation table for storing mode indicator wherein said packetized digital information comprises addressing data and wherein said addressing data is used in said data switching means for accessing said mode indicator in said translation table.

12. The node of claim 11 wherein said packetized digital information comprises a data frame that comprises a packet layer envelope and a link layer envelope, said link layer envelope comprising said addressing data.

13. The node of claim 12 wherein said translation table further comprises a physical address of a link for transmitting said data frame to other data switching means of said data connection.

14. The node of claim 13 wherein said translation table further comprises other addressing data for substitution for said addressing data in said data frame prior to transmitting said data frame to other data switching means.

15. In a data communication network comprising a plurality of nodes interconnected by links, a method of transmitting a data frame from a source terminal, connected to a source node, to a destination terminal, connected to a destination node, over a preselected data path comprising the steps of:

said source terminal transmitting said data frame, comprising a link layer envelope, said envelope comprising a first virtual link address and a control field, to said source node;

said source node translating said first virtual link address to find a mode indicator, having one of a plurality of possible values, and the address of a next link of said data path; and responsive to a first value of said first mode indicator, said source node transmitting said data frame to said next link of said data path without performing functions specified by said control field.

16. In the data communication network of claim 15, wherein said data frame further comprises a packet layer envelope comprising data specifying packet layer functions, the method of claim 19 wherein said source terminal transmits said data frame comprising said packet layer envelope and wherein said destination terminal performs functions specified by said data specifying packet layer functions.

17. The method of claim 16 further comprising the step of:

responsive to a second value of said mode indicator, said source node performing functions specified by said data specifying packet layer functions, performing functions specified by said control field, and transmitting said data frame to said next link.

18. The method of claim 15 wherein said translating step comprises the step of translating said first virtual link address to find a second virtual link address and substituting said second virtual link address for said first virtual link address in said data frame.

19. The method of claim 15 wherein said source node comprises a protocol handler, further comprising the steps of:

sending a control data message from said source terminal to said source node;

responsive to said control message, initializing said protocol handler of said source node with a virtual link number and address of said next link to permit a data frame having said initialized virtual link number to be transmitted across said node to said next link to another node.

20. The method of claim 15 further comprising the step of:

responsive to a second value of said mode indicator, said source node performing functions specified by said control field and transmitting said data frame to said next link.

21. The method of claim 15 further comprising the step of:

said source terminal substituting said first virtual link address for a terminal end point identifier in said link layer envelope.

22. The method of claim 15 further comprising the step of:

said source terminal substituting said first virtual link address for a service access point identifier and a terminal end point identifier in said link layer envelope.

23. In a data communication network comprising a plurality of nodes interconnected by links, a source node for transmitting a data frame from a source terminal, connected to said source node, to a destination terminal, connected to a destination node, over a preselected data path, said source node comprising:

means for receiving said data frame, comprising a link layer envelope, said envelope comprising a first virtual link address and a control field, from said source terminal:

means for translating said first virtual link address to find a mode indicator, having one of a plurality of possible values, and the address of a next link of said data path; and means responsive to a first value of said first mode indicator, for transmitting said data frame to said next link of said data path without performing functions specified by said control field.

24. The source node of claim 23 wherein said translating means comprises means for translating said first virtual link address to find a second virtual link address and means for substituting said second virtual link address for a said first virtual link address in said data frame.

25. The source node of claim 23 further comprising a protocol handler, wherein said source node further comprises means for receiving a control data message from said source terminal; and means responsive to said control message for initializing said protocol handler of said source node with a virtual link number and address of said next link to permit a data frame having said initialized virtual link to said number to be transmitted across said node to said next link to another node.

26. The source node of claim 23 wherein said source node further comprises means responsive to a second value of said mode indicator for performing functions specified by said control field and transmitting said data frame to said next link.

27. The source node of claim 23 further comprises means responsive to a second value of said mode indicator for performing functions specified by said data specifying packet layer functions, performing functions specified by said control field, and transmitting said data frame to said next link.

28. The source node of claim 23 wherein said source node further comprises means for receiving from said source terminal said first virtual link address substituted for a terminal end point identifier in said link layer envelope.

29. The source node of claim 23 wherein said source node further comprises means for receiving from said source terminal said first virtual link address substituted for a service access point identifier and a terminal end point identifier in said link layer envelope.

30. In a data communication network comprising a plurality of nodes interconnected by links, a method of transmitting a data frame from a source terminal, connected to a source node comprising a protocol handler, to a destination terminal, connected to a destination node, over a preselected data path comprising the steps of:

sending a control data message from said source terminal to said source node;

responsive to said control message, initializing said protocol handler of said source node with a virtual link number and address of a next link to permit a data frame having said initialized virtual link number to be transmitted to said next link;

said source terminal transmitting said data frame, comprising a link layer and a packet layer envelope, said link layer envelope comprising a first virtual link address and a control field, said packet layer envelope comprising data specifying packet layer functions, to said source node;

said source node translating said first virtual link address to find a mode indicator, having one of a plurality of possible values, a second virtual link address, and the address of a next link of said data path and substituting said second virtual link address for said first virtual link address in said data frame;

responsive to a first value of said first mode indicator, said source node transmitting said data frame to said next link of said data path without performing functions specified by said control field;

responsive to a second value of said mode indicator, said source node performing functions specified by said control field, performing functions specified by said data specifying packet layer functions, and transmitting said data frame to said next link;

responsive to a third value of said mode indicator, said source node performing functions specified by said control field and transmitting said data frame to said next link; and responsive to reception of said data frame, said destination terminal performing functions specified by said data specifying packet layer functions.

31. In a data communication network, a node for switching packetized digital information comprising:

means for switching data;

means, responsive to a request for setting up a data connection between a source terminal and a destination terminal, for selectively assigning to said data switching means a distinct individual control word for processing said packetized digital information;

said data switching means responsive to reception of said packetized digital information on said data connection for executing one of a plurality of sequences of program steps identified by said control word for processing said packetized digital information;

wherein said data switching means comprises a translation table for storing control words, and wherein said packetized digital information comprises addressing data and wherein said addressing data is used in said data switching means for accessing said control word in said translation table;

wherein said packetized digital information comprises a data frame that comprises a packet layer envelope and a link layer envelope, said link layer envelope comprising said addressing data;

wherein said node further comprises a plurality of other data switching means and wherein said data switching means adds internal addressing data for transmission of said data frame to one of said other data switching means and wherein one of said other data switching means deletes said internal addressing data prior to transmission of said data frame to a data link leaving said node.

32. In a data communication network, a node for switching packetized digital information comprising:

means for switching data;

means, responsive to a request for setting up a data connection between a source terminal and a destination terminal, for selectively assigning to said data switching means a distinct individual control word for processing said packetized digital information;

said data switching means responsive to reception of said packetized digital information on said data connection for executing one of a plurality of sequences of program steps identified by said control word for processing said packetized digital information;

wherein said data switching means comprises a translation table for storing control words, and wherein said packetized digital information comprises addressing data and wherein said addressing data is used in said data switching means for accessing said control word in said translation table;

wherein said packetized digital information comprises a data frame that comprises a packet layer envelope and a link layer envelope, said link layer envelope comprising said addressing data;

wherein at least one instance of said control word identifies a program for performing full link layer and full packet layer processing on said data frame.

33. In a data communication network, a node for switching packetized digital information comprising:

means for switching data;

means, responsive to a request for setting up a data connection between a source terminal and a destination terminal, for selectively assigning to said data switching means a distinct individual control word for processing said packetized digital information;

said data switching means responsive to reception of said packetized digital information on said data connection for executing one of a plurality of sequences of program steps identified by said control word for processing said packetized digital information;

wherein said data switching means comprises a translation table for storing control words, and wherein said packetized digital information comprises addressing data and wherein said addressing data is used in said data switching means for accessing said control word in said translation table;

wherein said packetized digital information comprises a data frame that comprises a packet layer envelope and a link layer envelope, said link layer envelope comprising said addressing data;

wherein at least one instance of said control word identifies a program for performing full link layer processing but performing no packet layer processing on said data frame.

34. In a data communication network, a node for switching packetized digital information comprising:
   means for switching data;
   means, responsive to a request for setting up a data connection between a source terminal and a destination terminal, for selectively assigning to said data switching means a distinct individual control word for processing said packetized digital information;
   said data switching means responsive to reception of said packetized digital information on said data connection for executing one of a plurality of sequences of program steps identified by said control word for processing said packetized digital information;
   wherein said data switching means comprises a translation table for storing control words, and wherein said packetized digital information comprises addressing data and wherein said addressing data is used in said data switching means for accessing said control word in said translation table;
   wherein said packetized digital information comprises a data frame that comprises a packet layer envelope and a link layer envelope, said link layer envelope comprising said addressing data;
   wherein said link layer envelope comprises a control field and at least one instance of said control word identifies a program for accessing said output data without performing processing indicated by said control field.

35. In a data communication network comprising a plurality of data switching points, a method of transmitting packetized digital information from a source terminal to a destination terminal comprising:
   responsive to a request for setting up a data connection from said source terminal to said destination terminal, selectively assigning to one of said plurality of data switching points in a data path between said source and said destination terminals a mode indicator, wherein said mode indicator specifies a level of processing to be performed on said packetized digital information at said one of said plurality of data switching points; and
   responsive to reception of said packetized digital information in said one of said plurality of data switching points of said data path, executing one of a plurality of sequences of program steps specified by said mode indicator for processing said packetized digital information.

36. The method of claim 35 wherein said packetized digital information comprises addressing data, and wherein said assigning step comprises the step of entering said mode indicator in a translation table of said data switching point, and said executing step comprises the step of translating said addressing data using said translation table to access said control word.

37. In a data communication network, a node for switching packetized digital information comprising:
   means for switching data;
   means, responsive to a request for setting up a data connection between a source terminal and a destination terminal, for selectively assigning to said data switching means a mode indicator for processing said packetized digital information, wherein said mode indicator specifies a level of processing to be performed on said packetized digital information by said data switching means;
   said data switching means responsive to reception of said packetized digital information on said data connection for executing one of a plurality of sequences of program steps specified by said mode indicator for processing said packetized digital information.

38. The node of claim 37 wherein said data switching means comprises a translation table for storing control words, wherein said packetized digital information comprises addressing data and wherein said addressing data is used in said data switching means for accessing said mode indicator in said translation table.

39. In a data communication network, a node for switching information comprising:
   means for switching data;
   means, responsive to a request for setting up a data connection between a source terminal and a destination terminal, for selectively assigning to said data switching means a distinct individual control for processing said packetized digital information, wherein said individual control word specifies a level of processing to be performed on said packetized digital information by said data switching means;
   said data switching means responsive to reception of said digital information on said data connection for executing one of a plurality of sequences of program steps specified by said word for processing said packetized digital information;
   wherein said data switching means comprises a translation table for storing control words, wherein said packetized digital information comprises addressing data and wherein said addressing data is used in said data switching means for accessing said control word in said translation table; and
   wherein said packetized digital information comprises a data frame that comprises a packet layer envelope and a link layer envelope, said link layer envelope comprising addressing data.

40. The node of claim 39 wherein said translation table further comprises a physical address of a link for transmitting said data frame to other data switching means of said data connection.

41. The node of claim 40 wherein said translation table further comprises other addressing data for substitution for said addressing data in said data frame prior to transmitting said data frame to other switching means.

* * * * *

UNITED STATES PATENT AND TRADEMARK OFFICE
CERTIFICATE OF CORRECTION

PATENT NO. : 4,894,822
DATED     : January 16, 1990
INVENTOR(S) : Rolfe E. Buhrke, James A. Davis and Douglas A. Spencer It is certified that error appears in the above-identified patent and that said Letters Patent is hereby corrected as shown below:

IN THE CLAIMS

Column 12, line  3, "mode control" should be "mode indicator";
Column 13, line 13, "mode indicator" should be "mode indicators";
Column 13, line 49, "19" should be "15".

Signed and Sealed this

Fifth Day of November, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,894,822
DATED : January 16, 1990
INVENTOR(S) : Rolfe E. Buhrke, James A. Davis, Douglas A. Spencer It is certified that error appears in the above-identified patent and that said Letters Patent is hereby corrected as shown below:

ON TITLE PAGE: right column, line 22;
Attorney, Agent or Firm "Marc A. Blackwell", should be
--Werner Ulrich, Ross T. Watland--.

Signed and Sealed this

Thirteenth Day of October, 1992

Attest:

DOUGLAS B. COMER

Attesting Officer

Acting Commissioner of Patents and Trademarks